March 17, 1964 E. J. POITRAS 3,125,251
MULTIPLE FLUID MEASURING AND DISPENSING APPARATUS
Filed Nov. 29, 1960 2 Sheets-Sheet 1

*INVENTOR.*
EDWARD J. POITRAS
BY Emery, Booth, Miller, + Townsend

ATTORNEYS

March 17, 1964  E. J. POITRAS  3,125,251
MULTIPLE FLUID MEASURING AND DISPENSING APPARATUS
Filed Nov. 29, 1960  2 Sheets-Sheet 2
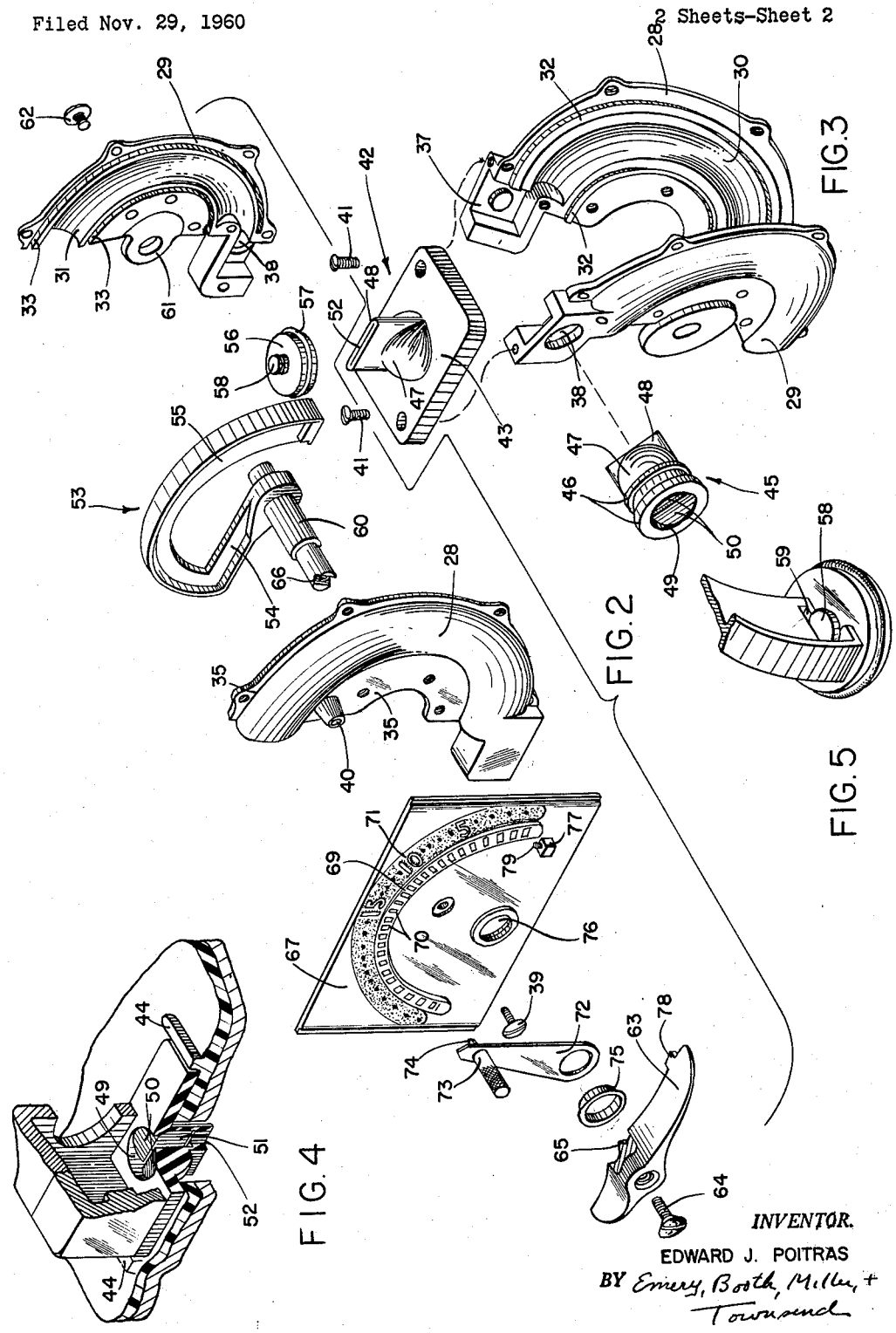
INVENTOR.
EDWARD J. POITRAS
BY Emery, Booth, Miller, + Townsend
ATTORNEYS United States Patent Office 3,125,251
Patented Mar. 17, 1964

3,125,251
MULTIPLE FLUID MEASURING AND
DISPENSING APPARATUS
Edward J. Poitras, Holliston, Mass., assignor to Highland
Laboratories, Holliston, Mass.
Filed Nov. 29, 1960, Ser. No. 72,432
8 Claims. (Cl. 222—135)

This invention relates generally to liquid measuring and dispensing and more particularly to an apparatus for storing different liquids and for measuring and dispensing selected volumes of those liquids as for combining in different desired mixtures.

The invention apparatus combines accuracy and efficiency, low cost and easy maintenance. It is of clean and compact design, durably and economically constructed, and fast and simple to operate.

The instant device has useful application, for example and in the form herein shown, to the tinting of paints. It enables the paint dealer to make up paints in hundreds of different colors, each according to a particular, predetermined colorant formula. With a chart of the colors and formulas the invention provides a universal tinting system by which a base paint may be colored to match any requirement and at the time of purchase.

With the present device the measuring and dispensing of colorants to the customer's order is done quickly, easily, and accurately. The measuring is positively controlled, and the dispensing is free from drip. And its embodying as herein in a minimum number of merely mechanical parts qualifies the apparatus also as trouble-free in use.

The invention will be better understood from a consideration of the following specification taken in conjunction with the accompanying drawings in which:

FIG. 2 is an exploded view of the invention pump;

FIG. 3 shows the pump chamber halves as inverted and reversed from the FIG. 2 position, and also the associated check valves as enlarged for clarity;

FIG. 4 shows a dispenser outlet construction in perspective and broken away to show the internal valve construction; and FIG. 5 is a fragmentary perspective of the piston arm and piston as turned over from the FIG. 2 position to show their connection.

Figure 1:
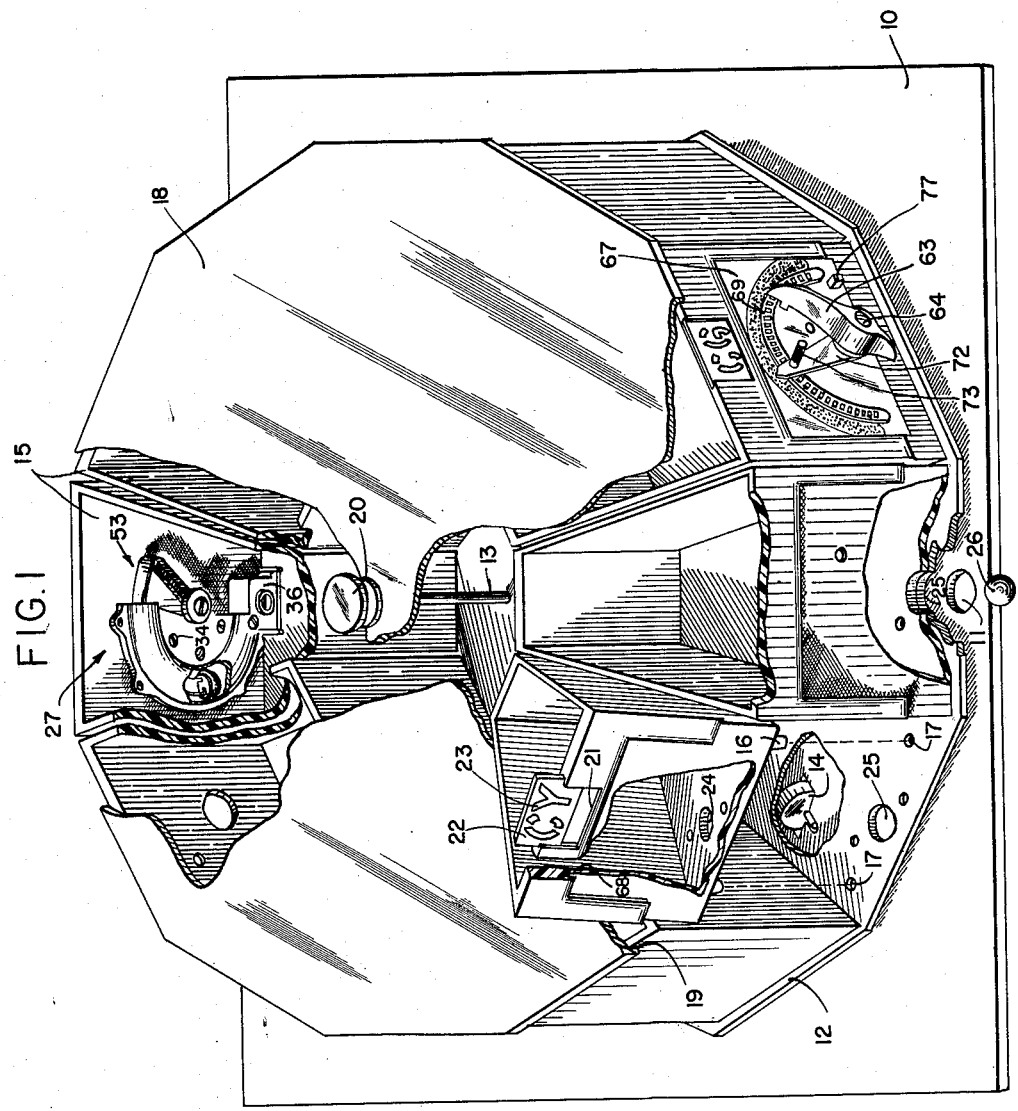
FIG. 1 shows an exemplary dispenser of the invention.

In the exemplary form herein shown the dispenser of the invention has a metal or other rigid base 10 which may be a plate, table or other plane surface presenting means adapted to be positioned over a liquid receptacle and having an opening 11 through which to dispense to said receptacle. A metal or other rigid turntable 12 is rotatably mounted on the base 10 and more particularly for swinging about a center shaft 13 and riding over a series of roller bearings 14 which may comprise wheels rotatable through openings in, and having stub shafts journalled in recesses in, the base 10.

A multiplicity or series of mating, duplicate liquid reservoirs or canisters 15 are uniformly distributed around the turntable 11, and are removably positioned or seated thereon as by engagement of their feet 16 through mating turntable openings 17. The canisters 15 are proportioned to contain the desired liquid volume, and they are conveniently constructed of a plastic sufficiently translucent to permit visual observation from without of the contained liquid level. In the indicated quadrilateral shape the canisters will admit further of easy cleaning out and also agitation or stirring of the liquid, that for the tinting example hereof being a paint colorant which may variously be packaged, such as in quart cans.

The canisters may readily be filled, and to any desired volume or level, through their open tops, which are in use closed by a dust cover 18 which may have an overhang or lip 19 for retaining the canisters, and which is removably secured as by a lock nut 20 threaded onto shaft 13.

The number of stations with which the dispenser is provided may of course be varied in accordance with the differing requirements of the various uses to which it may be put. For particular example, the twelve canisters herein indicated comprise at least the number required to contain all the colorants used in a universal tinting system which makes all colors.

The canisters 15 are adapted further as by front recesses 21 to receive liquid designating means, cards or plates 22 which may be colored and carry also code letter indicia 23 to identify the particular colorant with which the canister is or is to be charged.

With each of the canisters 15 there is provided means for the metered dispensing of unit volumes of the canister liquid through its bottom opening 24, which is aligned with a corresponding turntable opening 25 upon the seating of the canister as earlier described. In the front-center or operating position of the canister, in which it may be releasably secured as by a plunger 26, the openings 24, 25 are of course in registry also with the base opening 11.

The invention dispensing means comprise for each canister 15 a positive displacement pump assembly 27 which is manipulable from outside the canister front wall first to withdraw a selected unit volume from the canister liquid charge or supply in which the pump is immersed, and then to discharge said selected volume to a receptacle, such as a can of paint base, in which it is to be mixed with measured liquid volumes similarly drawn from others of the canisters.

The pump assembly is herein designed to minimum operating dimensions, for the same displacement capacity, by fashioning its piston chamber in a toroidal shape, or as a cylinder bent or developed around a curved or ring path. The toroid or cylinder ring is of about half-circular extent, and may be an aluminum casting. As so constituted it is conveniently formed also in mating halves 28, 29 presenting half-round piston recesses 30, 31. The recesses 30, 31 combine in assembly to form a piston chamber of cylindrical section and part circular extent, which is open at one end to receive the piston, and which communicates at the other end with the valve housing of the pump, as hereinafter mentioned.

With the bifurcated construction hereof it is desired to provide not only a tight seal of the parts but also for their uniting as a uniformly symmetrical cylinder. Accordingly, to hold them rigidly to a flush smooth interfitting across the cylinder seams, the toroid halves 28, 29 are provided further with tongue and groove or the like mating, interfitting projection and recess means 32, 33 which interlock in the assembly, in which the halves 28, 29 may be clamped by screws or the like 34 fastened through radial flanges or webs 35.

The pump assembly further comprises a valve housing or chamber 36 having a bottom recess 37 communicating with the piston recesses 30, 31, and with a side opening 38 to the fluid reservoir.

Each of the pumps is rigidly fixed to the inside of its canister front, as by a screw 39 passed through the front and into a stud 40 on the facing chamber half 28 and anchored to the inside of its canister bottom as by screws 41 threaded into the flat base of housing 36.

In accordance with the invention the valve housing 36 is fitted with self-closing or check valve means at the inlet and outlet openings 37, 38 whereby said openings respectively are automatically closed and opened for loading the pump from the canister reservoir on the withdrawal or intake stroke of the piston and are automatically opened and closed for emptying the pump through the canister outlet on the reverse or discharge stroke of the piston. As herein embodied such valve means comprise an outlet valve 42 which extends through the canister bottom and turntable openings 24, 25, FIG. 4, which has a gasket-like lateral sealing flange or web 43 clamped and sealing between the canister and valve housing, and which on installing may be positioned or centered by upstanding ribs 44 on the canister bottom.

A like inlet valve 45 is supported through housing opening 38 as by flanges 46 overlapping at both sides thereof, being mounted oppositely of outlet valve 42 in that whereas said outlet valve 42 extends and opens outwardly, the inlet valve 45 extends and opens inwardly, relative to the housing 36. Thus the inlet valve is opened and the outlet valve closed by the pump filling suction or intake stroke of the piston, and the reverse valve opening and closing action is produced by the reciprocating of the piston in the discharge or delivery stroke.

The outlet and inlet valves 42, 45 may be of rubber or the like elastomer and have the similar operative structure comprising an exteriorly rounded or domed portion or waist 47 from which extends a straight or square ended flatted portion or flap 48. The valves are interiorly formed with a cylinder or barrel recess 49 having flat bottom faces 50 inclining to a straight vertical bisecting gap or recess 51, of, say, 1/16" width or thickness, which is molded in, and which extends down the depth of the dome 47. Below said recess 51 the flap 48 has a slit 52 made or cut after molding of and without the removal of material from the valve.

The thickened waist or dome 47 of the valve resists collapse under negative pressure, as well as reinforcing the elastic tendency of the valve to close the slit 52, which tendency manifests itself on cooling and removal of the material from the mold. The gap 51 reduces and sharply defines the area of and so increases the pressure of the self-closing action of the valve, and provides in addition an immediately adjacent space into which the liquid may be squeezed out from between the faces of slit 52, whereby the valve is entirely drip-free.

For reciprocating a piston in the toroid chamber there is provided a piston arm 53 of the T cross-section for maximum strength and having a radially extending part 54 and an annularly projecting part 55 integral therewith and projecting freely through the open end of the toroid. The piston proper comprises a brass or similar disc or ring 56 mounting an annular sealing means such as O ring 57 for sealing engagement with the piston chamber wall, and which may be removably secured to the piston arm as by a stud 58 flanged or recessed for sliding reception in a keyhole 59, FIG. 5, in annular part 55 of the said piston arm.

The piston 56 and arm 53 are reciprocated in the toroid by a shaft 60 to which the radial part 54 is affixed and which is rotatably supported in a centrally apertured ear 61 of toroid half 29, in which it may be releasably secured by a screw 62. The shaft 60 extends through the canister front and there receives an operating handle 63 secured to the shaft as by a screw 64 and being keyed thereto as by mating rib and recess means 65, 66.

Means are provided by the invention for controlling the operation of the pumps 27 by selection of various metered or unit liquid volumes to be delivered on one or more of their dispensing manipulations, and comprising a plate 67 partially framed by a canister front recess 68 into which it may be slid from below, and having a raised scale or dial 69, around which are equidistantly spaced the graduations or recesses 70 which will be understood to represent unit volumes of piston displacement, successively increasing herein from right to left and which may for convenience be numbered as at 71, FIG. 2.

For positively and accurately relating the piston movement to the described measuring and indicating means 70, 71 there is provided a spring metal setter arm 72 having an upstanding handle 73 and opposite it a down facing point 74 biased to, and which may be pulled back by the handle for repositioning in any one of, the recesses 70. The arm 72 has a hollow rivet bearing 75 received over shaft 60 and fastened through an opening 76 in the plate 67. As best shown in FIG. 1, the piston handle 63 is reciprocable between the setter arm handle 73 and a zero or limit stop 77 on the plate 67. For fine adjustment the handle 63 may engage by its dependent lug 78 a set screw 79 which may be carried by the stop 77.

In the use of the device, in the paint tinting example, the operator will operatively position and pump from, in turn, the canisters containing the colorants called for by the formula of the desired color. In the dispensing from the selected canisters the pumps thereof are first preset to measure out the colorant volumes which are also specified in the formula, for tinting mixtures in the liquid or paint in the base container, which latter may for example be a quart or gallon can, and will be understood to be opened and positioned below the opening 11 in base 10. To positively control or limit a pump 27 to the specified volume in initiating any one such dispensing operation, the setter arm 72 is shifted from the zero or other prior position to the desired control position by grasping the handle 73 and pulling back on the spring 72 sufficiently to release or unseat the pin 74, then swinging the setter arm to bring its point over that recess 70 which measures the formula-specified number of liquid or colorant volume units, and then releasing the handle 73 to allow the spring 72 to seat or lock the pin 74 in the selected one of the recesses 70.

In any given dispensing manipulation of a pump 27 its handle 63 is simply reciprocated pull-push, leftward-rightward from and to the rightmost or empty position. More particularly, to load the pump to or with the preset colorant volume, the handle is swung from an initial position of engagement against the zero stop 77 in a counter-clockwise direction until it bears against the setter arm handle 73. This will be seen to effect a suction shift or stroke of the piston 56 by which that is retracted in chamber 30, 31 away from valve housing 36, producing in the latter a negative pressure which closes the outlet valve while opening the inlet valve and admitting through it the selected number of unit volumes of colorant liquid. To discharge the fluid thus withdrawn from the canister reservoir, the handle 63 is reciprocated or swung clockwise back to the initial or zero position. On this return or discharge stroke, the piston 56 is advanced toward the valve housing 36, inducing therein a positive pressure which closes the inlet valve and opens the discharge valve, and more particularly forces through the latter the same quantity of fluid that was sucked into the piston chamber on the intake stroke.

It will be appreciated that the valve housing 36 itself defines a volume which may initially be void or air-filled, but from which the air can readily be purged by a few initial priming manipulations of the pump. It will be understood also that the small residual volume which remains entrapped in the housing does not have a static head sufficient to open or produce a leak in outlet valve 42. Neither will it affect the accuracy of the pump, since, as just indicated, the liquid volume discharged on the dispensing stroke is the precise same amount as that with which the pump is loaded on the intake stroke.

My invention is not limited to the particular embodiment thereof illustrated and described herein, and I set forth its scope in my following claims.

I claim:

1. In a multiple liquid mixing and dispensing apparatus, a plurality of canisters defining each a liquid reservoir having an outlet, means for positioning said canisters for discharging from their outlets to a mixture receptacle, and a pump in each said reservoir, each said pump comprising a curved piston chamber, a piston in the chamber, check valve means for opening between said chamber and said reservoir and between the chamber and said outlet, means supported through and manipulable from without a front wall of said reservoir for manual reciprocating of said piston in the curved path of said chamber, means on said reservoir wall for measuring and indicating unit reservoir volumes for dispensing, and means for controlling the actuation of said reciprocating means in relation to said measuring and indicating means whereby upon push-pull manipulation of said reciprocating means between the zero and the selected limit position the desired number of unit reservoir volumes is dispensed from the reservoir.

2. The apparatus of claim 1 wherein said chamber is part-circular and wherein said reciprocating means comprises a shaft rotatably supported through said wall and an arm keyed to said shaft and shaped by its rotation to describe an arc of the circle of said chamber, and said arm extending through one end of said chamber and mounting said piston.

3. In a multiple liquid mixing and dispensing apparatus, a plurality of canisters defining each a liquid reservoir, means for positioning said canisters for discharging from their outlets to a mixture receptacle, and metered dispensing means associated with each said canister and comprising a curved piston chamber in the reservoir, a piston in the chamber rotary shaft, means supported through a wall of and manually manipulable from without the reservoir for reciprocating said piston in the curved path of said chamber, inlet and outlet openings in said chamber, the inlet opening to said reservoir and the outlet opening through a wall of said container, and check valves at said openings arranged alternately to open and close upon the suction and discharge strokes of said piston, means on said reservoir wall for measuring and indicating unit reservoir volumes for dispensing, and means for controlling the actuation of said reciprocating means in relation to said measuring and indicating means whereby upon push-pull manipulation of said reciprocating means between the zero and the selected limit position the desired number of unit reservoir volumes is dispensed from the reservoir.

4. In a multiple liquid mixing and dispensing apparatus, a plurality of canisters defining each a liquid reservoir having an outlet, means for positioning said canisters for discharging from their outlets to a mixture receptacle, and metered dispensing means associated with each said canister and comprising a direct acting positive displacement pump in the canister, said pump comprising a toroidal piston chamber and a piston reciprocable in said chamber, means for manipulating the pump piston to intake the liquid from the reservoir on the suction stroke and to deliver the liquid through a wall of the canister on the discharge stroke, and adjustable means arranged on the canister for mechanically limiting the movement of said reciprocating means and with it the length of said suction stroke, and for thereby determining the quantity of liquid delivered by said discharge stroke.

5. A liquid dispenser acording to claim 4 wherein said reciprocating means comprises a handle shiftable across a wall of the canister, and wherein said adjustable limiting means comprises a scale at said wall and graduated to unit volumes of pump displacement and an arm variously settable at the scale graduations and mounting a stop engagement by said handle.

6. A multiple liquid mixing and dispensing apparatus comprising a support having an opening for discharge to a mixture receptacle, a turntable rotatably mounted on said support, multiple liquid canisters distributed around said turntable, a manually manipulable, positive displacement liquid pump in each said canister, the pumps operable for delivery of the canister liquids through outlets which may alternately be brought into registry with said support opening, each said pump comprising a curved piston chamber, a piston in the chamber, a rotary shaft supported through a front wall of the associated canister, an arm carried by said shaft and mounting said piston and shaped to reciprocate the piston in the curved path of said chamber upon rotation of the shaft, and a handle mounted on said shaft outside the canister and arranged for rotary shifting of said shaft and with it said piston, and scale and adjustable setter means on said canister front walls and engageable by said handles to limit stop said shaft rotation and thereby control said pumps for the accurate dispensing of measured quantities of said liquids.

7. The apparatus of claim 6 wherein said scale has formations for releasable locking engagement by said setter means and for positive stop control of said handles of the pump and for delivery to the same or a different mixture receptacle.

8. The apparatus of claim 6 wherein the piston chambers are formed from halves mating in the plane of the curve and having interfitting formations at their engaged faces for rigid relating and flush smooth ordering of the chamber seams.

References Cited in the file of this patent

UNITED STATES PATENTS

| | | |
|---|---|---|
| 189,518 | Swan | Apr. 10, 1877 |
| 856,215 | Bergstrom et al. | June 11, 1907 |
| 1,925,695 | Hobson | Sept. 4, 1933 |
| 2,064,742 | Goldsmith | Dec. 15, 1936 |
| 2,094,702 | Hexter | Oct. 5, 1937 |
| 2,100,318 | Berham et al. | Nov. 30, 1937 |
| 2,167,690 | Serinis | Aug. 1, 1939 |
| 2,361,747 | Curtis et al. | Oct. 31, 1944 |
| 2,787,402 | Stiner | Apr. 2, 1957 |
| 2,951,617 | De Brock | Sept. 6, 1960 |
| 3,006,505 | Levin | Oct. 31, 1961 |
| 3,015,415 | Marsh et al. | Jan. 2, 1962 |

FOREIGN PATENTS

| | | |
|---|---|---|
| 8,960 | France | Dec. 16, 1852 |
| 509,916 | Great Britain | Oct. 19, 1937 |